US009776459B2

(12) United States Patent
Hironaka et al.

(10) Patent No.: US 9,776,459 B2
(45) Date of Patent: Oct. 3, 2017

(54) PNEUMATIC TIRE

(75) Inventors: Takayoshi Hironaka, Kodaira (JP);
Masayuki Kurebayashi, Kodaira (JP)

(73) Assignee: BRIDGESTONE CORPORATION,
Tokyo (JP)

( * ) Notice: Subject to any disclaimer, the term of this patent is extended or adjusted under 35 U.S.C. 154(b) by 719 days.

(21) Appl. No.: 14/343,212

(22) PCT Filed: Sep. 8, 2011

(86) PCT No.: PCT/JP2011/005055
§ 371 (c)(1),
(2), (4) Date: Apr. 7, 2014

(87) PCT Pub. No.: WO2013/035135
PCT Pub. Date: Mar. 14, 2013

(65) Prior Publication Data
US 2014/0246134 A1    Sep. 4, 2014

(51) Int. Cl.
*B60C 11/13*    (2006.01)
*B60C 11/24*    (2006.01)
(Continued)

(52) U.S. Cl.
CPC ............. *B60C 11/24* (2013.01); *B60C 11/02* (2013.01); *B60C 11/0306* (2013.01);
(Continued)

(58) Field of Classification Search
CPC ............... B60C 11/24; B60C 11/1353; B60C 2011/1361; B60C 11/1369; Y10T 152/10027
(Continued)

(56) References Cited

U.S. PATENT DOCUMENTS

2005/0269003 A1    12/2005    Fujii et al.
2006/0102267 A1*    5/2006    Takahashi ........... B60C 11/0306
152/209.18
(Continued)

FOREIGN PATENT DOCUMENTS

AT    EP 0591125 A1 *    4/1994    ......... B29D 30/0629
EP    1066991 A2    1/2001
(Continued)

OTHER PUBLICATIONS

Machine Translation: JP 01297304 A; Ushikubo, Toshio; no date.*
(Continued)

*Primary Examiner* — Michael H Wilson
*Assistant Examiner* — Kendra Ly
(74) *Attorney, Agent, or Firm* — Sughrue Mion, PLLC

(57) ABSTRACT

An object of the present invention is to provide a pneumatic tire capable of significantly increasing the possibility that the tire can be recycled as a base tire for a retreaded tire without so much sacrificing a product life of the tire prior to retreading. Specifically, the present inventions provides a pneumatic tire 1 having a tread portion 2, plural tread grooves including a first tread groove 5 and a second tread groove 15 formed in the tread portion, and a first bottom-up portion 10 with a top surface 10*a* as a tread wear indicator, the first bottom-up portion being provided at a groove bottom 5*b* of the first tread groove 5 such that a distance measured in the tire radial direction from an opening end position 5*a* of the first tread groove to the top surface 10*a* is x1, comprising: a second bottom-up portion 20 with a top surface 20*a* as a retread indicator, the second bottom-up portion being provided at a groove bottom 15*b* of the second tread groove 15 formed in the central region 3 of the tread portion 2 such that a distance measured in the tire radial (Continued)

direction from an opening end position 15a of the second tread groove to the top surface 20a is x2 shorter than said x1.

5 Claims, 6 Drawing Sheets

(51) Int. Cl.
    *B60C 11/02*     (2006.01)
    *B60C 11/03*     (2006.01)
(52) U.S. Cl.
    CPC ....... *B60C 11/1353* (2013.01); *B60C 11/1369* (2013.01); *B60C 2011/1361* (2013.01); *Y10T 152/10027* (2015.01)
(58) Field of Classification Search
    USPC .................................................... 152/209.22
    See application file for complete search history.

(56) References Cited

U.S. PATENT DOCUMENTS

2009/0320981 A1* 12/2009 Matsumoto ......... B60C 11/0306
                                                        152/209.8
2011/0079333 A1    4/2011 Collette et al.

FOREIGN PATENT DOCUMENTS

| JP | 63182906 U | 11/1988 | |
|----|----|----|----|
| JP | 01-208206 A | 8/1989 | |
| JP | 01-297304 A | 11/1989 | |
| JP | 01297304 A * | 11/1989 | |
| JP | 2139104 U | 11/1990 | |
| JP | 03-031007 A | 2/1991 | |
| JP | 622003 U | 3/1994 | |
| JP | EP 0654366 A1 * | 5/1995 | ............. B60C 11/11 |
| JP | 08-207515 A | 8/1996 | |
| JP | 2886634 B2 * | 4/1999 | ......... B60C 11/1369 |
| JP | 200246422 A | 2/2002 | |
| JP | 2003251632 A | 9/2003 | |
| JP | 2004106747 A * | 4/2004 | |
| JP | 2006051844 A | 2/2006 | |
| JP | 2009227154 A | 10/2009 | |
| WO | 2004/050390 A1 | 6/2004 | |

OTHER PUBLICATIONS

Machine Translation: JP2886634 B2; no date.*
Machine Translation: JP 2004106747 A; Kuroki, Takeshi; no date.*
Machine Translation: EP 0591125 A1; Kuzmany Dietrich Dipl-Ing; no date.*
International Search Report for PCT/JP2011/005055, dated Dec. 20, 2011.
Communication dated Jun. 3, 2015 from the European Patent Office in counterpart European Application No. 11872100.0.
Communication dated Feb. 25, 2014, issued by the Japanese Patent Office in counterpart Application No. 2010176038.
Communication dated Jul. 29, 2015, issued by the State Intellectual Property Office of the People's Republic of China in counterpart Application No. 201180073284.1.

* cited by examiner

PNEUMATIC TIRE

CROSS REFERENCE TO RELATED APPLICATIONS

This application is a National Stage of International Application No. PCT/JP2011/005055 filed Sep. 8, 2011, the contents of all of which are incorporated herein by reference in their entirety.

TECHNICAL FIELD

The present invention relates to a pneumatic tire and in particular to a pneumatic tire capable of significantly increasing the probability that the tire can be recycled as a base tire for a retreaded tire without so much sacrificing a product life of the tire prior to retreading in a case where a portion, in particular the central portion, of a tread of the tire tends to be locally worn.

BACKGROUND ART

Performances of a pneumatic tire generally deteriorate as a tread portion of the tire is worn as a result of continuous rotation under load applied thereon. Significant deterioration of drainage performance such as wet skid resistance in particular could lead to a serious situation. The wear limit of a tread portion of a tire is therefore indicated by tread wear indicators. Tread wear indicators are generally constituted of plural (six or so) bottom-up portions which are provided at a bottom of a groove in a tread portion along a circumference thereof and each formed by locally uplifting the groove bottom by a predetermined height. JIS D4230 prescribes that a tread wear indicator is to be a rise of 1.6 mm height from a groove bottom in a case of an automobile tire (excluding tires for a motor cycle, an agricultural machine, an industrial vehicle and a construction vehicle). In the case of such a tread wear indicator as described above, a user visually recognizes tread wear indicators, i.e. the rises or bottom-up portions in a groove, when the groove depth has decreased to 1.6 mm due to tire wear and the tread wear indicators are exposed at a ground-contact surface of the tread portion, thereby being warned by the tread wear indicators that it is time when the tire should be replaced.

PTL1 discloses a technique of providing a pair of bottom-up portions as tread wear indicators at an interval t of 10 to 20 mm therebetween in a groove in a tread portion of a tire such that pumping sound is generated when the pair of the bottom-up portions is exposed at a ground contact surface of the tread portion, to urge a user acoustically, as well as visually, to replace the tire.

CITATION LIST

Patent Literature

PTL 1: JP 08-207515 (Laid-Open)

SUMMARY OF THE INVENTION

Technical Problems

There has been an increasing demand for recycling tires to address the environmental issues in recent years. Tires thus recycles are widely known as retreaded tires. A "retreaded tire" generally represents a tire formed by removing a tread from a used tire to obtain a base tire and then attaching a new material as a new tread portion to the base tire. This rebuilding process of a used tire is referred to as "retreading".

Conventionally, a tire for airplane, for example, is subjected to retreading after a predetermined time of use and a tire for truck/bus, for example, is subjected to retreading after running a predetermined distance. A tire, however, is rotated under load in various road-surface conditions in actual use thereof and thus the degree of wear observed after a predetermined number of use or a predetermined running distance is not necessarily the same between tires. If even a small portion of a belt layer of a tire has been exposed due to too much tire wear, the tire can no longer be used as a base tire and most likely cannot be retreaded.

That is, conventionally there does not exist an effective means for reliably notifying a user of right time for retreading of a tire regardless of conditions under which the tire has been used before the tire is excessively worn to be unsuitable for a base tire.

In view of the situation described above, the inventors of the present invention first studied whether such a tread wear indicator for indicating right time for tire replacement as described in PTL1 can also function as an indicator for indicating right time for retreading or not. That is, the inventors of the present invention experimentally used the conventional tread wear indicator for indicating right wear limit for tire replacement, assuming that the tread wear indicator may simultaneously indicate right wear limit for retreading, as well. However, it turned out that a tire has already been worn too much, i.e. a possibility that the tire can be used as a base tire for retreading has already dropped too low, when the conventional tread wear indicator for indicating right wear limit for tire replacement is exposed at a ground contact surface of a tread portion of the tire.

One might think in the aforementioned case that constantly observing the conventional tread wear indicator to make sure to subject the tire to retreading prior to the exposure of the tread wear indicator at a ground contact surface of the tread would ensure timely use of the tire as a base tire. Such a method, however, cannot accurately determine an amount of tread rubber wear. For example, one may wrongly judge that a tire is to be replaced, although it is too early for the replacement, thereby extremely reducing the product life of the tire after all.

In view of the aforementioned problems, an object of the present invention is to provide a pneumatic tire capable of significantly increasing the possibility that the tire can be recycled as a base tire for a retreaded tire without so much sacrificing a product life of the tire prior to retreading.

Solution to the Problems

The inventors of the present invention, as a result of the aforementioned study, discovered that provision of an additional indicator which can be exposed at a ground contact surface of a tread portion of a tire by wear of the tread portion before the tread wear indicator as described above is reduces the possibility that the tire cannot be used as a base tire for retreading. The inventors of the present invention then also investigated the optimum position of the additional indicator in view of the matters described below specific to retreading, thereby completing the present invention.

Specifically, the present invention, considering the aforementioned problems, has following primary features.

(1) A pneumatic tire having a tread portion, plural tread grooves including a first tread groove and a second tread groove formed in the tread portion, and a first bottom-up portion with a top surface as a tread wear indicator, the first bottom-up portion being provided at a groove bottom of the first tread groove such that a distance measured in the tire radial direction from an opening end position of the first tread groove to the top surface is x1, comprising:

a second bottom-up portion with a top surface as a retread indicator, the second bottom-up portion being provided at a groove bottom of the second tread groove formed in the central region of the tread portion such that a distance measured in the tire radial direction from an opening end position of the second tread groove to the top surface is x2 shorter than said x1.

(2) The pneumatic tire of (1) above, wherein, provided that d1 is the groove depth of the first tread groove, (d1−x2)≥3.0 mm.

(3) The pneumatic tire of (1) or (2) above, wherein the first tread groove is a circumferential groove formed in the central region of the tread portion and the second tread groove is a tire widthwise groove formed in the central region of the tread portion.

(4) The pneumatic tire of (3) above, wherein the tire widthwise groove is a groove branched from a groove wall of the circumferential groove, and the second bottom-up portion is provided such that it is distanced from a branching position at which the tire widthwise groove is branched from the groove wall of the circumferential groove and that it is located within 15 mm, in a direction of the groove width center line of the tire widthwise groove, from the intersection between the groove width center line of the tire widthwise groove and the groove width center line of the circumferential groove.

(5) The pneumatic tire of any of (1) to (4) above, wherein a plurality (2 to 8) of the second bottom-up portions are provided along a circumference line of the tire at predetermined intervals therebetween.

(6) The pneumatic tire of any of (1) to (5) above, wherein an area of the top surface of the second bottom-up portion is in the range of 10 mm$^2$ to 30 mm$^2$ (inclusive of 10 mm$^2$ and 30 mm$^2$) in a plan view.

(7) The pneumatic tire of any of (1) to (6) above, wherein the top surface of the second bottom-up portion has a projection or a recess.

(8) The pneumatic tire of any of (1) to (7) above, wherein the second bottom-up portion has, in a cross section thereof in the width direction of the second tread groove, a configuration in which the top surface of the second bottom-up portion is smoothly connected with groove walls of the second tread groove by curves.

Advantageous Effect of the Invention

According to the present invention, it is possible to significantly increase the possibility that a tire can be recycled as a base tire for a retreaded tire without so much sacrificing a product life of the tire prior to retreading by providing a second bottom-up portion in a groove in the central region of a tread portion of the tire such that the second bottom-up portion can be exposed at a ground contact surface of the tread portion due to wear of the tread portion earlier than a tread wear indicator.

BRIEF DESCRIPTION OF THE DRAWINGS

FIG. 5B is a cross sectional view in the longitudinal direction of the second tread groove, and FIG. 5C is a perspective view of the second bottom-up portion only.

DESCRIPTION OF THE EMBODIMENTS

The present invention will be described further in detail with reference to the drawings hereinafter. As a rule, the same reference numbers are assigned to the same components and repetitive explanations thereof will be omitted.

A pneumatic tire of the present invention has a tread portion, plural tread grooves including a first tread groove and a second tread groove formed in the tread portion, a first bottom-up portion as a tread wear indicator provided at a groove bottom of the first tread groove, and a second bottom-up portion as a retread indicator provided at a groove bottom of the second tread groove formed in the central region of the tread portion. The first bottom-up portion has a top surface and is provided such that a distance measured in the tire radial direction from an opening end position of the first tread groove to the top surface is x1. The second bottom-up portion has a top surface and is provided such that a distance measured in the tire radial direction from an opening end position of the second tread groove to the top surface is x2 shorter than said x1.

First Embodiment

Figure 1:
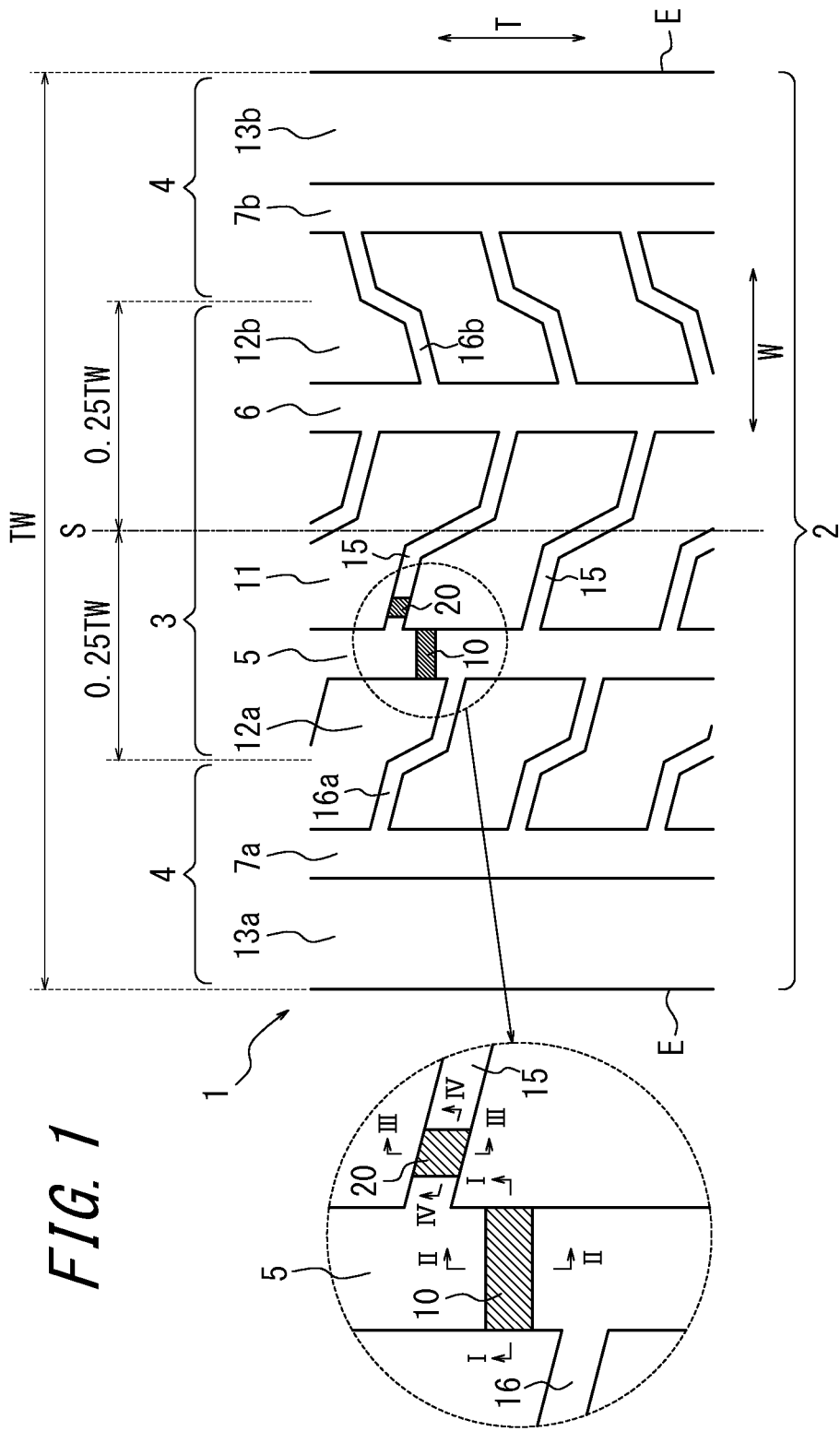
FIG. 1 is a developed view of a part of a tread portion of a pneumatic tire according to a representative embodiment of the present invention.

The representative pneumatic tire of the present invention as described above will be described in detail with reference to FIGS. 1 to 4. FIG. 1 is a developed view of a part of a tread portion 2 of a pneumatic tire 1 according to a first embodiment of the present invention. The pneumatic tire 1 has four circumferential grooves 5, 6, 7a, 7b extending in the tire circumferential direction T and plural tire widthwise grooves 15, 16a, 16b extending substantially in the tire width direction W in the tread portion 2. A block row 11 constituted of plural blocks is demarcated by two circumferential grooves 5, 6 situated closest to the tire equatorial plane S among the four circumferential grooves 5, 6, 7a, 7b and the tire widthwise grooves 15. Further, a block row 12a and a block row 12b are demarcated by the circumferential grooves 5, 6, the two circumferential grooves 7a, 7b situated on the outer side in the tire width direction of the circumferential grooves 5, 6, and the tire widthwise grooves 16a, 16b, respectively. A tread pattern is thus formed based on the block rows 11, 12a, 12b. A (shoulder) rib 13a and a (shoulder) rib 13b are respectively formed by the circumferential grooves 7a, 7b situated on the outer side in the tire width direction and tread ends E in respective side regions 4 of the tread portion 2.

A first bottom-up portion 10 as a tread wear indicator is provided at a groove bottom 5b of the circumferential groove 5 formed in the central region 3 of the tread portion 2 in the present embodiment. "The central region of the tread portion" represents a region extending across a length corresponding to 50% of the tread width W with the center of the region coinciding with the tire equatorial plane S in the present invention. Further, the "(tread) side regions" represents regions other than the central region 3, of the tread portion 2, in the present invention.

Figure 2A:
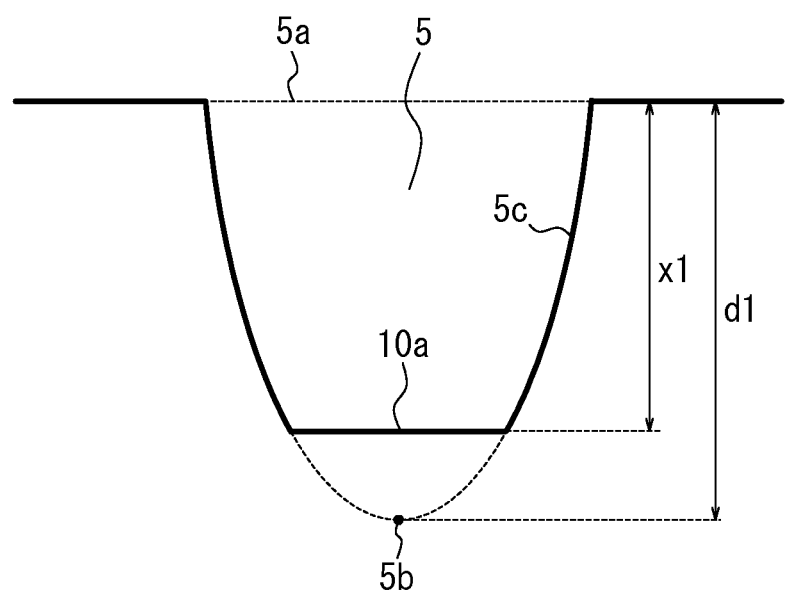
FIG. 2A is a cross sectional view of a portion shown in an enlarged manner within a broken-line circle of FIG. 1, cut along the I-I line in the circle, and represents a cross section of a first bottom-up portion cut in the groove width direction of the first tread groove.
Figure 2B:
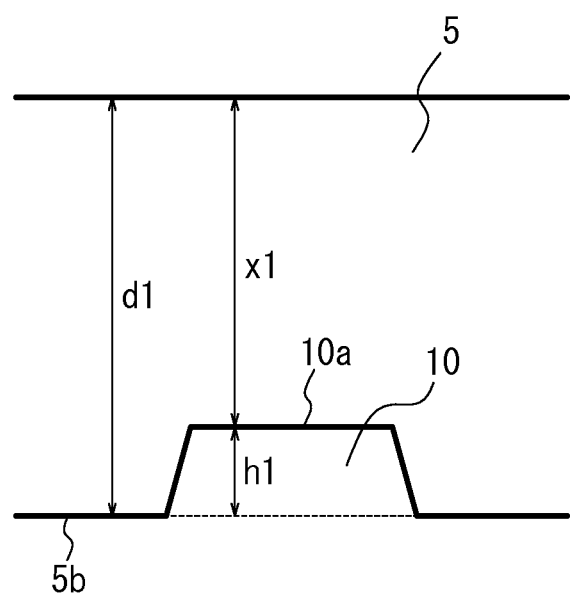
FIG. 2B is a cross sectional view of the same encircled portion of FIG. 1, cut along the II-II line in the circle.

The first bottom-up portion 10 has a top surface 10a and is provided such that a distance measured in the tire radial direction from an opening end position 5a of the circumferential groove 5 as the first tread groove to the top surface is x1, as shown in FIGS. 2A and 2B. The groove depth of the circumferential groove 5 is d1 and the height of the first bottom-up portion is h1. JIS D4230 prescribes that h1 is to be 1.6 mm in an automobile tire (excluding tires for a motor cycle, an agricultural machine, an industrial vehicle and a construction vehicle). In this case, a user visually recognizes the bottom-up portion 10 when the remaining groove depth of the circumferential groove 5 has decreased to 1.6 mm due to tire wear and the bottom-up portion 10 is exposed at a ground-contact surface of the tread portion, thereby being warned by the bottom-up portion 10 that it is time when the tire should be replaced. In the present invention, the height h1 of the first bottom-up portion is determined by: measuring the distance (depth) x1 from a tread surface (the opening end position 5a) to the top surface 10a of the first bottom-up portion and the depth d1 of the first tread groove in which the first bottom-up portion is provided, respectively; and calculating the difference between d1 and x1. For example, x1 is to be 6.4 mm when d1 is 8 mm.

Figure 3A:
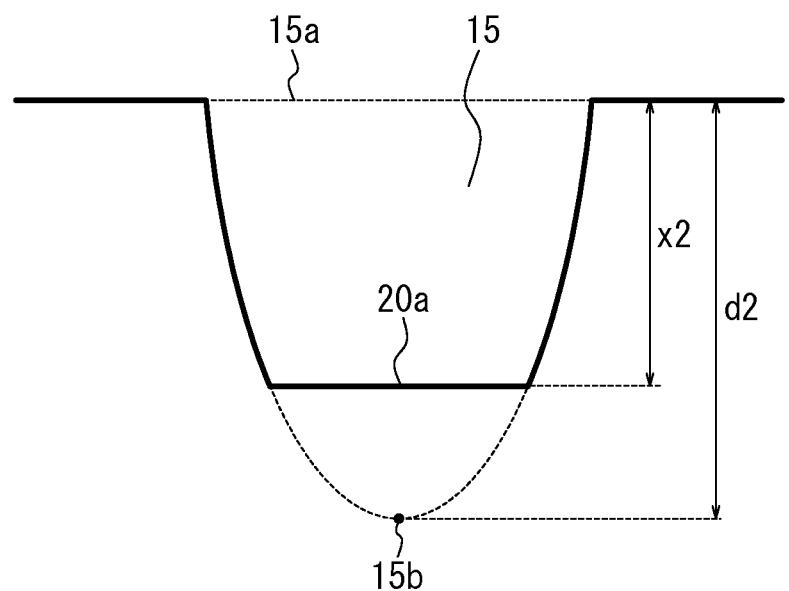
FIG. 3A is a cross sectional view of a portion shown in an enlarged manner within a broken-line circle of FIG. 1, cut along the III-III line in the circle, and represents a cross section of a second bottom-up portion cut in the groove width direction of the second tread groove.
Figure 3B:
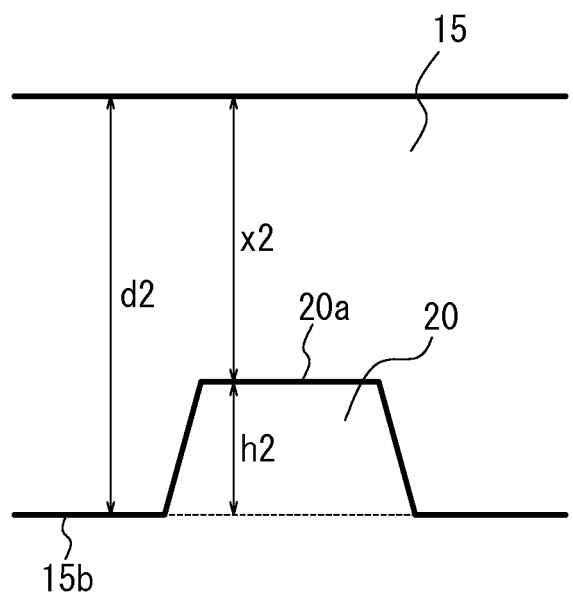
FIG. 3B is a cross sectional view of the same encircled portion of FIG. 1, cut along the IV-IV line in the circle.

The present invention characteristically includes in the structure thereof a second bottom-up portion 20. The second bottom-up portion 20 has a top surface 20a and is provided in the second tread groove as a designated tread groove formed in the central region 3 of the tread portion 2, at the groove bottom 15b of the tire widthwise groove 15 in the present embodiment, such that a distance measured in the tire radial direction from an opening end position 15a of the tire widthwise groove 15 to the top surface 20a is x2 shorter than said x1, as shown in FIGS. 1, 3A and 3B. The second bottom-up portion 20 is a retread indictor and is exposed at a ground contact surface of the tread portion when the tread portion has been worn by a thickness corresponding to the distance x2, thereby urging a user to carry out retreading by the exposure thereof. The groove depth of the tire widthwise groove 15 is d2 and the height of the second bottom-up portion is h2. The height h2 of the second bottom-up portion can be determined as is the case with the first bottom-up portion.

The history of how the aforementioned characteristic structures were adopted to complete the present invention will be discussed hereinafter together with the details of effects caused by these characteristic structures. As described above, the inventors of the present invention thought of using, as a technique of recognizing right time for retreading of a tire before the tire is worn too much to be used as a base tire for retreading regardless of conditions under which the tire has been used, an indicator which notifies a user of a right degree of wear limit suitable for retreading based on the same principle as a tread wear indicator. When a standard automobile provided with a typical tread wear indicator having a height of 1.6 mm is used until the tread wear indicator is exposed at a ground contact surface of the tread portion, a part of a belt layer of the tire tends to be exposed in a subsequent retreading process using the tire as a base tire and thus a rate at which tires can be used as base tires may eventually drop to an extremely low level. In short, using a tire to the wear limit generally necessitating replacement of the tire often makes it impossible to use the tire as a base tire for retreading. It is therefore necessary, at least in a case where a tread portion of a tire is supposed to be uniformly worn, to provide the tire with another indicator having a height adjusted such that the another indicator is exposed at a ground contact surface of the tread portion earlier than a tread wear indicator. The inventors of the present invention, based on the aforementioned analysis, provided a tire with a second bottom-up portion 20 having a top surface 20a such that a distance x2 measured in the tire radial direction from a tread surface to the top surface 20a is shorter than x1.

Further, the inventors of the present invention discovered that it is critically important which tread groove, among the tread grooves formed in the tread portion 2, is provided with the second bottom-up portion 20. A tread tends to be partially worn under actual use of a tire. For example, a tire having a relatively large ground contact area such as a tire for heavy load tends to experience early wear in the vicinities of tread end portions thereof. In contrast, a tire having a relatively small ground contact area tends to experience early wear at the central region of a tread thereof. In the case where the tread central region of a tire experiences early wear, if the second bottom-up portion 20 were to be provided in a tread groove in a side region 4 of a tread thereof (e.g. the circumferential groove 7a, 7b), the central region 3 would have been more worn than each tread side region 4 when the second bottom-up portion 20 is exposed at a ground contact surface of the tread, which possibly makes the tire unsuitable for a base tire for retreading. Accordingly, the second bottom-up portion 20 is to be provided in a tread groove formed in the central region 3 of the tread in this case.

On the other hand, in the case where the tread side region of a tire experiences early wear, if the second bottom-up portion 20 is provided in the central region 3 of a tread, each tread side region 4 will have been more worn than the central region 3 when the second bottom-up portion 20 is exposed at a ground contact surface of the tread. However, a problem of belt exposure in the tread side region 4 is unlikely to occur in this case because each tread side region generally has thicker tread rubber than the central region (the worn tread portion is to be removed by buffing to obtain a base tire when the pneumatic tire 1 is retreaded). That is, the inventors of the present invention revealed in this case that provision of the second bottom-up portion 20 in a tread groove formed in the central region of a tire is unlikely to cause a situation in which the tire is rendered unsuitable for use as a base tire due to partial wear in the tread side region(s).

In summary, the inventors of the present invention discovered that when a tire is to be retreaded it is possible to reliably recognize right time for retreading of the tire before the tire is worn too much to be used as a base tire for retreading, regardless of how partial wear proceeds in the tire, by providing a tread groove formed in the central region of a tire with the second bottom-up portion 20, thereby completing the present invention.

The second bottom-up portion 20 can be used as a retread indicator for notifying a user of right time for retreading by exposure of itself at a ground contact surface of the tread portion due to tread wear, as described above. Provision of the aforementioned retread indicator for notifying a user of right time for retreading of a tire safely prevents the product life of the tire prior to retreading from being sacrificed unlike the case where only tread wear indicators are provided.

A user of the pneumatic tire 1 according to the present embodiment of the invention can freely decide whether the tire should be retreaded or not. If the user has decided to carry out retreading of the tire, the user can have the tire retreaded when the second bottom-up portion 20 is exposed at a ground contact surface of the tread. If the user has decided not to carry out retreading of the tire, the user may continue to use the tire even after the second bottom-up portion 20 is exposed at a ground contact surface of the tread and then should stop using it when the first bottom-up portion 10 is exposed at a ground contact surface of the tread, to replace the tire with a new tire.

The first bottom-up portion 10 is generally provided in a circumferential groove and is provided in the circumferential groove in the central region 3 of the tread portion 2 in the present embodiment. That is, the first tread groove is the circumferential groove in the central region 3 of the tread portion 2 in the present embodiment. On the other hand, the second bottom-up portion 20 is preferably provided in a tire widthwise groove in the central region 3 of the tread portion 2 in the present embodiment. That is, the second tread groove is preferably the tire widthwise groove in the central region 3 of the tread portion 2 in the present embodiment. It is possible to avoid a user's mixing up a tread wear indicator and a retread indicator and thus ensure the respective indicators to fully demonstrate functions thereof by providing the tread wear indicator in a circumferential groove and the retread indicator in a tire widthwise groove, respectively. A winter tire sometimes has a platform provided in a circumferential groove in a tread portion thereof for indicating wear corresponding to 50% of the depth of the circumferential groove but the retread indicator of the present embodiment is safely distinguished from the platform, as well. Further, provision of the second bottom-up portion 20 in the tire widthwise groove is preferable because then the second bottom-up portion does not disturb drainage performance of the circumferential grooves 5, 6.

Figure 4:
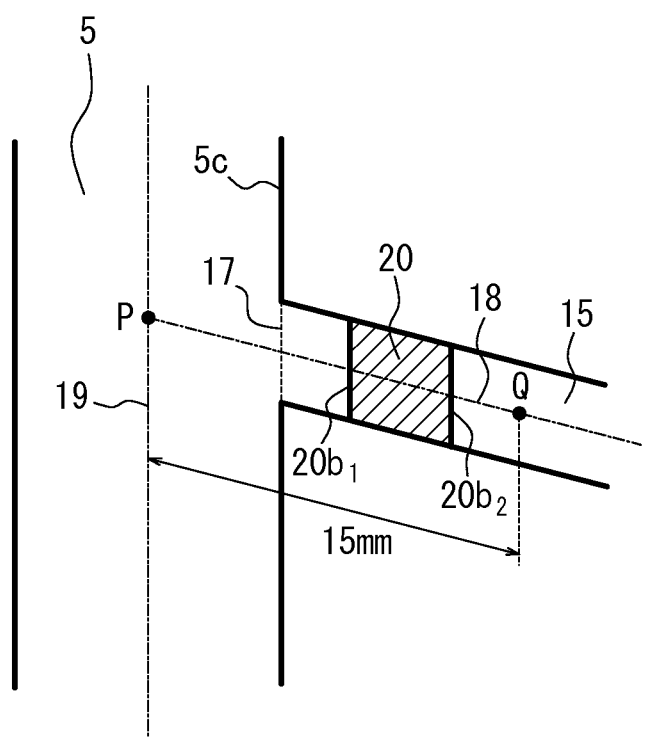
FIG. 4 is an explanatory view of a preferable position at which the second bottom up portion in FIG. 1 is to be provided.

A preferable disposition of the second bottom-up portion 20 will be described with reference to FIG. 4. The tire widthwise groove 15 to be provided with the second bottom-up portion 20 is preferably a groove branched from a groove wall 5c of the circumferential groove 5. Further, the second bottom-up portion 20 is preferably provided such that the second bottom-up portion 20 is: distanced from a branch position 17 at which the tire widthwise groove 15 is branched from the groove wall 5c of the circumferential groove 5; and located to be within 15 mm, in a direction of the groove width center line 18 of the tire widthwise groove 15, from the intersection P between the groove width center line 18 of the tire widthwise groove 15 and the groove width center line 19 of the circumferential groove 5 (point Q in FIG. 4 represents a position on the groove width center line 18, which is 15 mm away from the intersection P). The expression that "the second bottom-up portion 20 is distanced from the branched position 17" represents that one end $20b_1$ on the circumferential groove side of the second bottom-up portion 20 is distanced from the branching position 17. If the second bottom-up portion 20 is adjacent to the circumferential groove 5, stress is concentrated between the groove wall 5c and the second bottom-up portion 20, thereby facilitating crack generation therein. However, such crack generation can be suppressed by providing the second bottom-up portion 20 to be distanced from the circumferential groove 5. The expression that "the second bottom-up portion 20 is located within 15 mm from the intersection P" represents that either the other end $20b_2$ on the opposite side of the one end $20b_1$, of the second bottom-up portion 20, coincides with the point Q or located on the side of the circumferential groove 5 than the point Q. Providing the second bottom-up portion 20 to be located within 15 mm from the intersection P is preferable because such proximity of the circumferential groove and the second bottom-up portion 20 allows an user to easily make simultaneous visual recognition of the circumferential groove and the second bottom-up portion 20 in a case where observation of an amount of wear in the vicinity of the circumferential groove is started before full exposure of the second bottom-up portion 20 at a ground contact surface of the tread portion in order to ensure timely retreading.

A side surface (sidewall) portion corresponding to the tread wear indicator, of the tire, is generally marked so that the position of the indicator is easily confirmed. It is preferable a side surface (sidewall) portion corresponding to the second bottom-up portion 20 as the retread indicator, of the tire, is also marked in this regard because then the positional relationship between the first bottom-up portion 10 and the second bottom-up portion 20 can be free of any particular constraint.

According to a study carried out by the inventors of the present invention, the height h2 of the second bottom-up portion is preferably at least 3.0 mm and the most preferably 3.2 mm in all-season tires for bus/truck each having tire size of 275/80R22.5, the circumferential groove 5 (the groove depth d1=15.8 mm) and the tire widthwise groove 15 (the groove depth d2=15.8 mm) in the tread central region, and the first bottom-up portion 1 (h1=1.6 mm) provided in the circumferential groove 5, because then a rate of successful application to base tires remarkably improves as described in Examples below.

Further, according to another study, it was revealed that the height h2 of the second bottom-up portion is preferably at least 3.0 mm and the most preferably 3.2 mm in tires for truck having different tire size of 225/80R17.5, the circumferential groove 5 (the groove depth d1=14.7 mm) and the tire widthwise groove 15 (the groove depth d2=17.7 mm) in the tread central region, and the first bottom-up portion 1 (h1=1.6 mm) provided in the circumferential groove 5, because then a rate of successful application to base tires remarkably improves. In the same type of tires for truck, h2 was most preferably 2.2 mm when d2 was decreased by 1 mm to 13.7 mm. It has been revealed from the aforementioned findings that the top surface of the second bottom-up portion is most preferably positioned, regardless of tire size, when the height of the top surface measured from the groove bottom of the circumferential groove 5 provided with the tread wear indicator (the first bottom-up portion) is 3.2 mm. Accordingly, the value of (d1−x2), i.e. a distance from the groove bottom of the circumferential groove 5 to the top surface of the second bottom-up portion, is preferably at least 3.0 mm and most preferably 3.2 mm in the present invention. The upper limit of the value (d1−x2) is preferably 4.0 mm and more preferably 3.5 mm. The value (d1−x2) is preferably at least 3.0 mm because then a tread portion is prevented from having been worn too much when the second bottom-up portion 20 is exposed at a ground contact surface of the tread portion and thus the possibility that the tire can be used as a base tire for retreading is enhanced. The value (d1−x2) larger than 4.0 mm, however, does not further enhance the possibility that the tire can be used as a base tire for retreading and rather results in too early retreading or too short product life of the pre-retreading tire, which is disadvantageous in terms of both the environmentally-friendly strategy and the production cost. Therefore, the value (d1−x2) is to be ≤4.0 mm. In summary, setting the value (d1−x2) to be 3.0≤(d1−x2)≤4.0 is presumably effective in terms of enhancing the possibility that a tire can be used as a base tire for retreading without undesirably shortening the pre-retreading product life of the tire.

The groove to be provided with the tread wear indicator (the first bottom-up portion) is inevitably specified (designated) in a tire because the height of the tread wear indicator or the remaining depth of the designated groove (1.6 mm) must correspond to the use limit of the tire, although the groove depth d1 of the circumferential groove 5 to be provided with the tread wear indicator may vary depending on the tire size. The present invention is based on a discovery that the height of a retread indicator measured from the groove bottom of a groove provided with a tread wear indicator is a factor affecting the possibility that a tire can be used as a base tire for retreading. The maximum groove depth of a main groove is described in TRA ENGINEERING DESIGN INFORMATION 3-01-07.

Increasing the height of the second bottom-up portion 20 of a tire enhances the possibility that the tire can be used as a base tire for retreading but too large height of the second bottom-up portion rather undesirably shortens the pre-retreading product life of the tire, as described above. It is therefore preferable to further generalize the aforementioned content and set x2/x1 to be 0.84≤x2/x1≤0.91 to effectively enhance the possibility that a tire can be used as a base tire for retreading without undesirably shortening the pre-retreading product life of the tire. Specifically, x2/x1≤0.91 is preferable because then a tread portion is prevented from having been worn too much when the second bottom-up portion 20 is exposed at a ground contact surface of the tread portion and thus the possibility that the tire can be used as a base tire for retreading is enhanced. The ratio x2/x1<0.84, however, does not further enhance the possibility that the tire can be used as a base tire for retreading and rather results in too early retreading or too short product life of the pre-retreading tire, which is disadvantageous in terms of both the environmentally-friendly strategy and the production cost. Therefore, the ratio x2/x1 is to be ≥0.84.

It is preferable that a plurality (2 to 8) of the second bottom-up portions 20 are provided along a circumference line of a tire at predetermined intervals therebetween. It is preferable that at least two second bottom-up portions 20 are provided along a circumference of a tire because then at least one second bottom-up portion is likely to be seen if other or some of the second bottom-up portions are not. 8 second bottom-up portions along one circumference line of a tire are enough, however, because increasing the number of the second bottom-up portions to more than eight fails to further improve visibility of the second bottom-up portions. These second bottom-up portions 20 are preferably provided at substantially even intervals therebetween in terms of ensuring the same level of visibility among the respective second bottom-up portions.

It is preferable that an area of the top surface 20a of the second bottom-up portion 20 is in the range of 10 mm$^2$ to 30 mm$^2$ (inclusive of 10 mm$^2$ and 30 mm$^2$) in a plan view. Visibility of the second bottom-up portion 20 when it is exposed at a ground contact surface of the tread portion improves by setting the area of the top surface 20a of the second bottom-up portion 20 to be ≥10 mm$^2$. The second bottom-up portion 20 having too large an area of the top surface 20a exceeding 30 mm$^2$, however, rather suppresses movement of the tread patterns adjacent to the second bottom-up portion in the front-rear direction, thereby possibly functioning as a starting point of partial (local) wear.

Second Embodiment

Figure 5A:
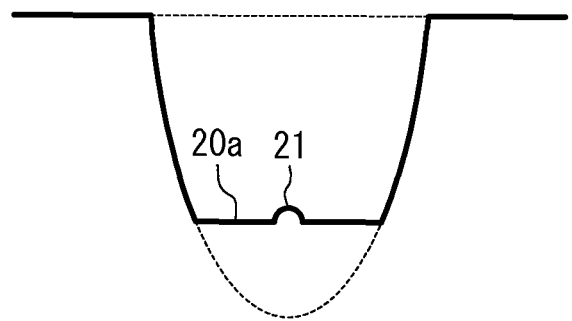
FIGS. 5A-5C are views each showing the second bottom-up portion of a pneumatic tire according to another embodiment of the present invention and FIG. 5A is a cross sectional view in the groove width direction of the second tread groove.
Figure 5B:
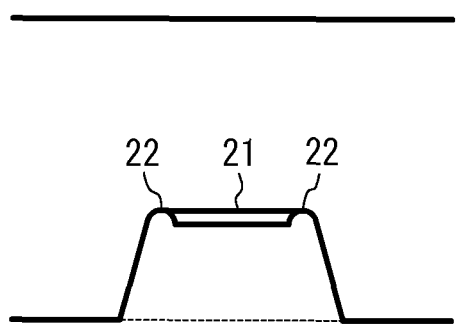
Figure 5C:
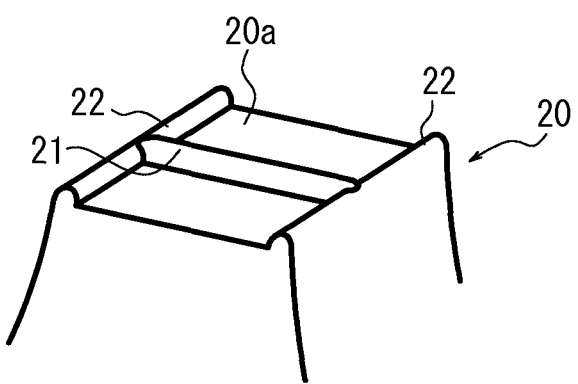

A pneumatic tire according to another or second embodiment of the present invention will be described with reference to FIGS. 5A to 5C. The top surface 20a of the second bottom-up portion 20 of the second embodiment has projection(s)/recess(es) therein, although the top surface 20a of the second bottom-up portion 20 of the first embodiment is a flat plane. The top surface 20a of the present embodiment has two projections 22 each extending in the groove width direction of the tire widthwise groove 15 and a projection 21 extending in the longitudinal direction of the tire widthwise groove 15, as shown in the perspective view of FIG. 5C. FIG. 5B is a cross sectional view in the longitudinal direction of the tire widthwise groove 15 as the second tread groove (cut along a line not including the projection 21).

As a result of provision of the projections at the top surface 20a, only the projections are exposed at a ground contact surface of the tread portion earlier than exposure of the top surface 20a as wear of the tread portion proceeds, thereby successfully notifying a user of the oncoming wear limit for timely retreading at a stage some time before tread wear actually reaches the wear limit for timely retreading. Further, as a result of provision of the two-way projections intersecting each other as shown in FIG. 5C, visibility of the projections improves when these projections are exposed at a ground contact surface of the tread.

A recess may be formed in place of the aforementioned projections in the present embodiment. In this case, it is preferable to design the dimensions of the second bottom-up portion such that the top surface 20a having a recess formed therein should be first exposed at a ground contact surface (to notify the user of the oncoming wear limit for timely retreading) and that a subsequent stage, where the top surface has been made flat after the recess disappeared due to further wear, should coincide with the wear limit for timely retreading.

The present embodiment is basically the same as the first embodiment, except that the configuration of the top surface 20a of the former differs from that of the latter as described above.

Third Embodiment

A pneumatic tire according to yet another or third embodiment of the present invention will be described with reference to FIG. 6. The second bottom-up portion 20 of the pneumatic tire of the third embodiment has, in a cross section thereof in the groove width direction of the tire widthwise groove 15 as the second tread groove, a configuration in which the top surface 20a of the second bottom-up portion 20 is smoothly connected with groove walls 15c of the tire widthwise groove 15 by curves. In this case, crack generation between the second bottom-up portion 20 and the groove walls 15c can be well suppressed because the top surface 20a of the second bottom-up portion 20 is connected with groove walls 15c via smooth curves linking the top surface and the groove walls.

The present embodiment is basically the same as the first embodiment, except that the configuration of the top surface 20a of the former has curved portions 20c.

OTHER EMBODIMENTS

The first bottom-up portion 10 is provided in the circumferential groove 5 in the central region 3 and the second bottom-up portion 20 is provided in the tire widthwise groove 15 in the central region 3 in the first to third embodiments described above. The present invention, however, is not limited to these embodiments. The second bottom-up portion 20 may be provided in a circumferential groove as long as the second bottom-up portion 20 exists in a tread groove within the tread central region 3. In this case, both the first bottom-up portion 10 and the second bottom-up portion 20 may be provided in the same one circumferential groove 5, i.e. the same one circumferential groove may serve as the first tread groove and the second tread groove. Further, in a case where the first bottom-up portion 10 and the second bottom-up portion 20 are provided in different tread grooves, respectively, the tread groove to be provided with the first bottom-up portion 10 may be a tread groove in a tread side region 4 as long as it is a tread groove.

In the aforementioned other embodiments, it is acceptable that the top surface 20a of the second bottom-up portions 20 is provided with projection(s)/recess(es) as in the second embodiment or connected with the groove walls 15c via curved portions as in the third embodiment.

The internal structure of the tire is not particularly restricted in the present invention. The present invention can be suitably applied in this connection to a pneumatic tire having a belt layer disposed in tread rubber because such a tire cannot be used as a base tire for retreading if the belt layer thereof is exposed.

The pneumatic tire of the present invention is applicable to tires for any purposes, as well as tires for passenger vehicles. The pneumatic tire of the present invention, when it is used for all-season tires for truck/bus, significantly enhances a recovery rate of base tires in good conditions for retreading, i.e. causes a particularly good effect.

The present inventions is applicable to a pneumatic tire having any tread pattern, although the foregoing first to third embodiments are described in connection with a block row-based tread pattern. For example, a tread pattern having a center rib and plural tire widthwise grooves formed in the center rib will also be acceptable. Further, the tire widthwise grooves need not open to the circumferential grooves, although they do in the present embodiments.

The pneumatic tire of the present invention can be manufactured by providing a mold for a vulcanization process with patterns corresponding to the first bottom-up portions and the second bottom-up portions and carrying out vulcanization molding of a tire using the mold.

EXAMPLES

Pneumatic test tires of Examples and Comparative Examples were prepared. Two types of test tires: size (A) and size (B) were prepared for each Example/Comp. Example. Comparative evaluations, carried out by using these test tires in order to clearly grasp an effect of the present invention, will be described hereinafter. The respective pneumatic test tires share following details in common.

| | Tire size | |
|---|---|---|
| | (A): 275/80R22.5 (Tires for truck/bus) | (B): 225/80R17.5 (Tires for truck) |
| Tread pattern | Block pattern shown in FIG. 1 | Block pattern shown in FIG. 1 |
| Groove width of circumferential groove 5, 6, 7a, 7b | 11 to 14 (mm) | 8 to 11 (mm) |
| Groove depth d1 of circumferential groove 5, 6, 7a, 7b | 15.8 (mm) | 14.7 (mm) |
| Groove width of tire widthwise groove 15, 16a, 16b | 7 to 9 (mm) | 5.5 to 6.5 (mm) |
| Groove depth d2 of tire widthwise groove 15, 16a, 16b | 15.8 (mm) | 14.7 (mm) |
| Internal structure of tire | Radial tire having a pair of intersecting belts (cord angle: 74°, single ply) | Radial tire having a pair of intersecting belts (cord angle: 74°, single ply) |
| First bottom-up portion as tread wear indicator | As shown below | As shown below |
| Groove depth d1 of circumferential groove 5 in tread central region (in whose circumference a first bottom-up portion is provided) | 15.8 (mm) | 14.7 (mm) |
| h1 | 1.6 mm | 1.6 mm |
| Area of top surface | 60 mm² | 50 mm² |
| x1 | 14.2 (mm) | 13.1 (mm) |

Second Bottom-Up Portion

The tire of Comp. Example 1 had no second bottom-up portion (retread indicator) provided therein.

In each of the tires of Comp. Example 2, a second bottom-up portion having a top surface area of 26 mm² for tire size (A) or 21 mm² for tire size (B) and h2=2.5 mm was provided in the circumferential groove 7a in a tread side region. The top surface was a flat plane without projection/recess nor curved faces connected with the groove walls. The groove width center line of the circumferential groove 7a was distanced by 0.325 W from the tire equatorial plane in each of tire size (A) and tire size (B). In each of the tires of Comp. Example 3, a second bottom-up portion having a top surface area of 26 mm² for tire size (A) or 21 mm² for tire size (B) and h2=3.0 mm was provided in the circumferential groove 7a in a tread side region. The top surface was a flat plane without projection/recess nor curved faces connected with the groove walls. The groove width center line of the circumferential groove 7a was distanced by 0.325 W from the tire equatorial plane in each of tire size (A) and tire size (B).

In each of the tires of Example 1, a second bottom-up portion having a top surface area of 26 mm² for tire size (A) or 21 mm² for tire size (B) and h2=3.2 mm was provided in the circumferential groove 5 in the tread central region. The top surface was a flat plane without projection/recess nor curved faces connected with the groove walls. The groove width center line of the circumferential groove 5 was distanced by 0.13 W from the tire equatorial plane in each of tire size (A) and tire size (B).

In each of the tires of Examples 2 to 5, a second bottom-up portion having the same top surface area as that of Example 1 and h2 as shown in Table 1 was provided in the tire widthwise groove 15 in the tread central region. The top surface was a flat plane without projection/recess nor curved faces connected with the groove walls. Regarding the location details of the second bottom-up portion as described in connection with FIG. 4, one end on the circumferential groove side of the second bottom-up portion was distanced by 2 mm from the branching position at which the tire widthwise groove was branched from the circumferential groove; and the other end on the opposite side of the one end, of the second bottom-up portion, was distanced by 12.4 mm (tire size (A)) or 10.9 mm (tire size (B)) from the intersection P in Examples 2 to 5.

(Evaluation of the Rate of Successful Application to Base Tires for Retreading)

Each of the test tires was assembled with an application rim prescribed in JATMA standards (rim width: (A) 7.50, (B) 6.00), inflated at internal pressure: (A) 900 kPa, (B) 700 kPa, and run under load: (A) 1.6 t, (B) 0.75 t. The test tires of Comp. Example 1 were each collected when the first bottom-up portion was exposed at a ground contact surface of a tread portion thereof and the test tires of Comp. Examples 2, 3 and Examples 1 to 5 were each collected when the second bottom-up portion was exposed at a ground contact surface of a tread portion thereof. Whether the test tires thus collected could be used as base tires for retreading or not was analyzed. In each Comp. Example/Example, 110 tires were tested for tire size (A) and 160 tires were tested for tire size (B). The rate of successful application to base tires for retreading thus determined for each Comp. Example/Example is shown as evaluation results in Table 1.

(Evaluation of Product Life Before Retreading)

Time taken for the respective bottom-up portions to be exposed at a ground contact surface of the tread portion from the start of running, i.e. first product life running time, was measured for each of the test tires. "First (maximum) product life" of each of the test tires was expressed as an index value of the first product life running time relative to the "first product life" value of Comp. Example 1 tire being 100. The results are shown in Table 1 for evaluation. The larger "first product life" represents the longer or better pre-retreading product life of the tire.

(Evaluation of Secondary Product Life)

In each of Comp. Example/Example, tires suitable for retreading among the 110 tires of size (A) and the 160 tires of size (B) were subjected to retreading and the tires thus retreaded were each run until a trouble occurred or, in the case no trouble occurred, until the tread wear indicator thereof indicating the remaining groove depth of 1.6 mm was exposed (second product life running). The "second product life" index value of each Comp. Example/Example was then obtained by: using only the first product life running time as the product life for each of the tires which could not be retreaded; calculating the sum of the first product life running time and the "second product life running" time to obtain the product life for each of the tires subjected to retreading; summing up the product life values of all 270 tires and calculating the average of the product life; and converting the average value to an index value relative to the corresponding value of Comp. Example 1 being 100. The index value thus obtained, i.e. the second product life including the product life after retreading, of each of Comp. Examples and Examples is shown in Table 1. The larger "second product life" represents the longer or better total product life of the tire.

TABLE 1-A

| | | Second bottom-up portion | | | | | | Evaluation results | | |
|---|---|---|---|---|---|---|---|---|---|---|
| | Location in tread | Groove provided with second bottom-up portion | h2 (mm) | x2 (mm) | x1 (mm) | $\frac{x2}{x1}$ | d1-x2 (mm) | Rate of successful application to base tire (%) | Tire product life (first) INDEX | Tire product life (second) INDEX |
| 275/80R22.5 | | | | | | | | | | |
| Comp. Example 1 | — | — | — | — | 14.2 | — | — | 20 | 100 | 100 |
| Comp. Example 2 | side region | Circumferential groove 7a | 2.5 | 13.3 | 14.2 | 0.94 | 2.5 | 30 | 96 | 128 |
| Comp. Example 3 | side region | Circumferential groove 7a | 3.0 | 12.8 | 14.2 | 0.90 | 3.0 | 35 | 92 | 132 |
| Example 1 | Central region | Circumferential groove 5 | 3.2 | 12.6 | 14.2 | 0.89 | 3.2 | 65 | 89 | 156 |
| Example 2 | Central region | Tire widthwise groove 15 | 3.2 | 12.6 | 14.2 | 0.89 | 3.2 | 65 | 89 | 158 |
| Example 3 | Central region | Tire widthwise groove 15 | 3.0 | 12.8 | 14.2 | 0.90 | 3.0 | 40 | 90 | 136 |
| Example 4 | Central region | Tire widthwise groove 15 | 3.5 | 12.3 | 14.2 | 0.87 | 3.5 | 65 | 87 | 156 |
| Example 5 | Central region | Tire widthwise groove 15 | 4.0 | 11.8 | 14.2 | 0.83 | 4.0 | 70 | 83 | 158 |

TABLE 1-A-continued

| | | Second bottom-up portion | | | | | Evaluation results | | |
|---|---|---|---|---|---|---|---|---|---|---|
| | Location in tread | Groove provided with second bottom-up portion | h2 (mm) | x2 (mm) | x1 (mm) | $\frac{x2}{x1}$ | d1-x2 (mm) | Rate of successful application to base tire (%) | Tire product life (first) INDEX | Tire product life (second) INDEX |
| 225/80R17.5 | | | | | | | | | | |
| Example 6 | Central region | Tire widthwise groove 15 | 2.5 | 12.2 | 13.1 | 0.93 | 2.5 | 35 | 93 | 133 |
| Example 7 | Central region | Tire widthwise groove 15 | 3.0 | 11.7 | 13.1 | 0.89 | 3.0 | 40 | 89 | 136 |
| Example 8 | Central region | Tire widthwise groove 15 | 3.2 | 11.5 | 13.1 | 0.88 | 3.2 | 65 | 88 | 157 |
| Example 9 | Central region | Tire widthwise groove 15 | 3.5 | 11.2 | 13.1 | 0.85 | 3.5 | 70 | 85 | 156 |

It is confirmed from comparison of Comp. Example 1 with Examples 1 to 5 that the rate of successful application to base tires can be increased by providing in each tire a retread indicator which is exposed at a ground contact surface of a tread earlier than a tread wear indicator. Although the "first product life" index values of Examples 1 to 5 are naturally smaller than the "first product life" index value of Comp. Example 1, the smallest of the former is 83 with respect to 100 of the latter and even this smallest value does not cause a problem because the second product life after retreading thereof is significantly long. It should be noted that, in the case where no retread indicator is provided in a tire, the first product life running time of the tire must be terminated somewhat early anyway in order to ensure successful retreading and the first product life of the tire will be short after all. That is, it can be reasonably concluded that Examples 1 to 5 were able to enhance the possibility of successful application of pre-retreading tires to base tires for retreading without sacrificing the product life values of the pre-retreading tires so much.

Further, it is understood from the results of Examples 1 to 5 that the (d1−x2) value≥3.0 mm ensures a good result and that the rate of successful application to base tires remarkably enhances when the (d1−x2) value is set to be 3.2 mm (Examples 1, 2) in particular. The same tendency was confirmed in the test tires of different tire size (Examples 6 to 9), as well.

Next, an acceleration test in wet conditions was carried out by: assembling each of the size (A) test tires of Example 1 and Example 2 with an application rim (7.50×22.5) prescribed by JATMA standards; mounting the tire thus assembled with the rim (×4) on a drive shaft of a vehicle: 2-D·4 and inflating the tire at internal pressure of 900 kPa; and running the vehicle on a proving ground. Example 2 tire exhibited slightly better drainage performance than Example 1 tire.

Example 10 Tires

Test tires of Example 10 were prepared in substantially the same conditions as the Example 2 tires, except that, regarding the position of the second bottom-up portion described in connection with FIG. 4, an end on the circumferential groove side of the second bottom-up portion coincided with the branching position in the former. The Example 10 tires thus prepared were subjected to the aforementioned tests like the Example 2 tires. Cracks were generated at root portions of the second bottom-up portion, whereby the rate of successful application to base tires of the Example 10 tires slightly dropped to 63%.

Example 11 Tires

Pneumatic test tires of Example 11 were prepared in substantially the same conditions as the Example 2 tires, except that the top surface of the second bottom-up portion of each tire was provided with projections (height: 0.3 to 0.5 mm) as shown in FIG. 5 in the former. The Example 11 tires thus prepared were subjected to the aforementioned tests like the Example 2 tires. Better visibility of the second bottom-up portion was confirmed in the Example 11 tires than the Example 2 tires because only the projections were first exposed at a ground contact surface in the former, although the rate of successful application to base tires in Example 11 was substantially the same as that in Example 2.

Example 12 Tires

Figure 6:
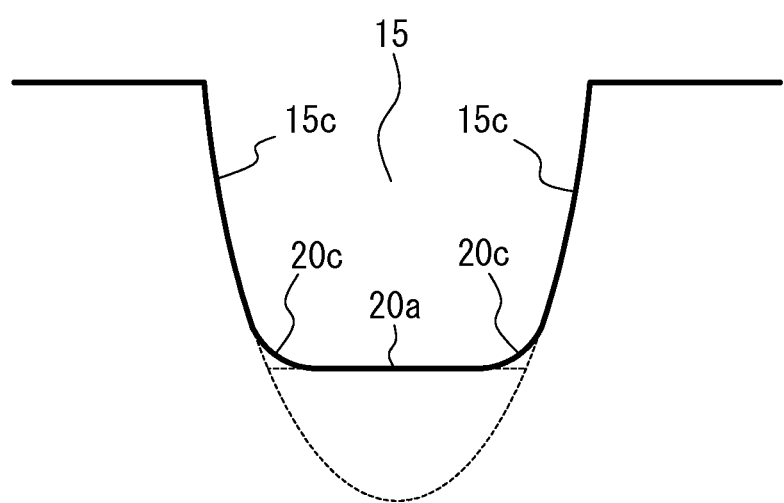
FIG. 6 is a view showing the second bottom-up portion of a pneumatic tire according to yet another embodiment of the present invention and represents a cross sectional view of the second bottom-up portion cut in the groove width direction of the second tread groove.

Pneumatic test tires of Example 12 were prepared in substantially the same conditions as the Example 2 tires, except that the top surface of the second bottom-up portion of each tire was connected with the groove walls by way of smoothly curved surfaces as shown in FIG. 6 in the former. The Example 12 tires thus prepared were subjected to the aforementioned tests like the Example 2 tires. It was confirmed that crack generation in the vicinities of connection lines between the groove walls and the top surface of the second bottom-up portion was suppressed, as compared with Example 2, although the rate of successful application to base tires in Example 12 was substantially the same as that in Example 2.

INDUSTRIAL APPLICABILITY

According to the present invention, it is possible to significantly increase the possibility that a tire can be recycled as a base tire for a retreaded tire without so much sacrificing a product life of the tire prior to retreading by providing a second bottom-up portion in a groove in the central region of a tread portion of the tire such that the second bottom-up portion can be exposed at a ground contact surface of the tread portion due to wear of the tread portion earlier than a tread wear indicator.

REFERENCE SIGNS LIST

Pneumatic tire
2 Tread portion
3 Central region of tread portion
5 Circumferential groove (First tread groove)
5a Opening end position of circumferential groove
5b Groove bottom of circumferential groove
10 First bottom-up portion
10a Top surface of first bottom-up portion
15 Tire widthwise groove (Second tread groove)
15a Opening end position of tire widthwise groove
15b Groove bottom of tire widthwise groove
20 Second bottom-up portion
20a Top surface of second bottom-up portion

The invention claimed is:

1. A pneumatic tire having a tread portion, plural tread grooves including a first tread groove and a second tread groove formed in the tread portion, and a first bottom-up portion with a top surface as a tread wear indicator, the first bottom-up portion being provided at a groove bottom of the first tread groove such that a distance measured in the tire radial direction from an opening end position of the first tread groove to the top surface is x1, comprising:
 a second bottom-up portion with a top surface as a retread indicator, the second bottom-up portion being provided at a groove bottom of the second tread groove formed in the central region of the tread portion such that a distance measured in the tire radial direction from an opening end position of the second tread groove to the top surface is x2 shorter than said x1,
 wherein the first tread groove is a circumferential groove formed in the central region of the tread portion, the second tread groove is a tire widthwise groove formed in the central region of the tread portion, and the second bottom-up portion is provided only in said tire widthwise groove in the central region of the tread portion, and
 the central region of the tread portion represents a region extending across a length corresponding to 50% of the tread width W with the center of the region coinciding with the tire equatorial plane S;
 wherein between 2 to 8 of the second bottom-up portions are provided along a circumference line of the tire at predetermined intervals therebetween.

2. The pneumatic tire of claim 1, wherein the tire widthwise groove is a groove branched from a groove wall of the circumferential groove, and
 the second bottom-up portion is provided such that it is distanced from a branching position at which the tire widthwise groove is branched from the groove wall of the circumferential groove and that it is located within 15 mm, in a direction of the groove width center line of the tire widthwise groove, from the intersection between the groove width center line of the tire widthwise groove and the groove width center line of the circumferential groove.

3. The pneumatic tire of claim 1, wherein an area of the top surface of the second bottom-up portion is greater than or equal to 10 mm$^2$ and less than or equal to 30 mm$^2$ in a plan view.

4. The pneumatic tire of claim 1, wherein the top surface of the second bottom-up portion has a projection or a recess.

5. The pneumatic tire of claim 1, wherein the second bottom-up portion has, in a cross section thereof in the width direction of the second tread groove, a configuration in which the top surface of the second bottom-up portion is smoothly connected with groove walls of the second tread groove by curves.

* * * * *